United States Patent [19]

Matsuzaki

[11] Patent Number: 5,138,442
[45] Date of Patent: Aug. 11, 1992

[54] IMAGE REGISTRATION SYSTEM FOR MULTIPLE PICTURE TUBE PROJECTION TELEVISION

[75] Inventor: Atsushi Matsuzaki, Kanagawa, Japan

[73] Assignee: Sony Corporation, Tokyo, Japan

[21] Appl. No.: 703,852

[22] Filed: Mar. 21, 1991

[30] Foreign Application Priority Data

May 28, 1990 [JP] Japan .................................. 2-137466

[51] Int. Cl.⁵ ............................................. H04N 9/31
[52] U.S. Cl. ......................................... 358/60; 382/44
[58] Field of Search ...................... 358/60, 64; 382/44

[56] References Cited

U.S. PATENT DOCUMENTS 5,020,116  5/1991  Macaulay ............................. 358/60

FOREIGN PATENT DOCUMENTS 0402137 12/1990 European Pat. Off. .
62-104295  5/1987 Japan .
62-125790  6/1987 Japan .

Primary Examiner—James J. Groody
Assistant Examiner—Kim Yen Vu
Attorney, Agent, or Firm—Lewis H. Eslinger; Jay H. Maioli

[57] ABSTRACT

A projector including a projector to superpose pictures on a screen, the pictures being displayed on cathode ray tubes corresponding to different colors. Reference signals are inputted to the corresponding cathode ray tubes for a predetermined period of time after application of power so that one of both a picture with a uniform brightness and a picture with a uniform color is formed all over the screen in response to the reference signals. The projector effectively reduces the fluctuation in registration of the displayed pictures.

1 Claim, 3 Drawing Sheets

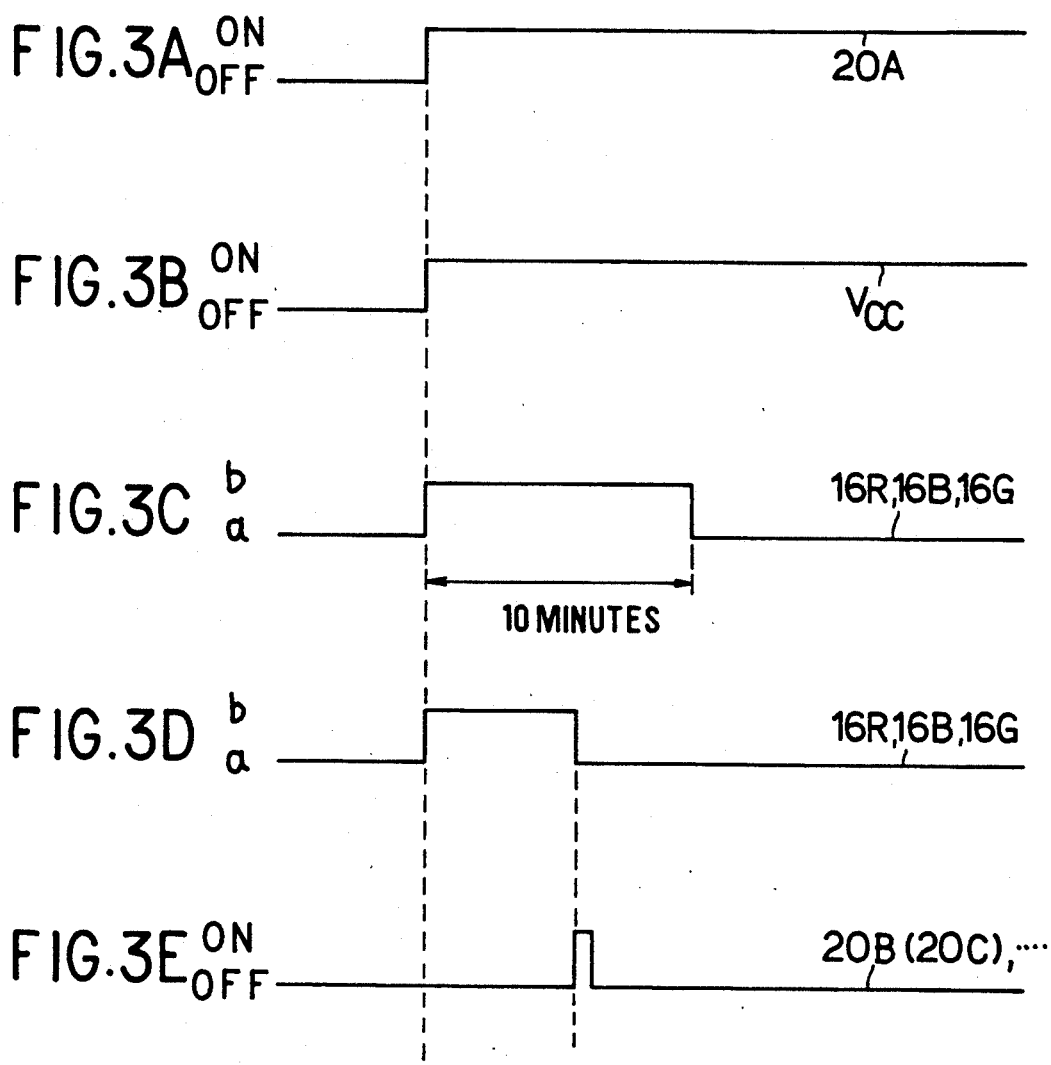

IMAGE REGISTRATION SYSTEM FOR MULTIPLE PICTURE TUBE PROJECTION TELEVISION

BACKGROUND OF THE INVENTION

The present invention relates to a projector, and particularly relates to a projector for projecting displayed pictures of cathode ray tubes.

In such conventional projectors, red, blue and green displayed pictures are constructed by cathode ray tubes for red, blue and green, respectively, and a large color picture is formed by superposing the displayed pictures on a large screen.

These projectors using cathode ray tubes have a problem in that fluctuation in registration of the displayed pictures of the cathode ray tubes on the screen takes place since the displayed pictures change in position on the screen with the lapse of time after power is turned on.

SUMMARY OF THE INVENTION

Accordingly, it is an object of the present invention to provide a projector which is capable of reducing the fluctuation of registration of the displayed pictures.

In view of this and other objects the present invention provides a projector, which comprises: a plurality of cathode ray tubes corresponding to different colors; projecting means for superposing displayed pictures constructed in the cathode ray tubes on a screen; and reference signal supplying means for supplying reference signals to the corresponding cathode ray tubes for a predetermined period of time after application of power so that one of both a picture with a uniform brightness and a picture with a uniform color is formed all over the screen in response to the reference signals, whereby fluctuation in registration of the displayed pictures is effectively reduced.

BRIEF DESCRIPTION OF THE DRAWINGS

In the drawings:

FIG. 3 is a signal waveform chart illustrating the operation of the projector of FIG. 1.

DETAILED DESCRIPTION OF THE PREFERRED EMBODIMENT

Figure 1:
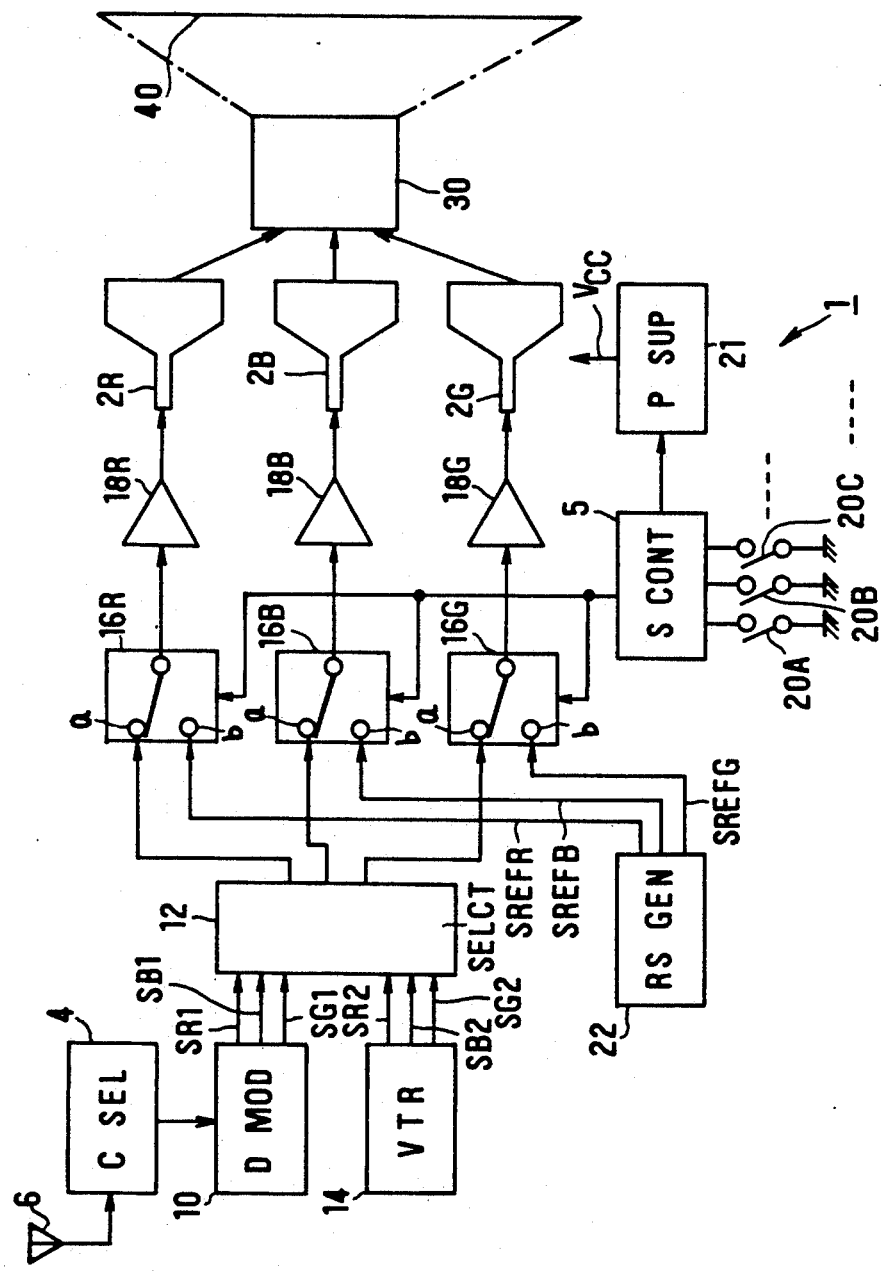
FIG. 1 is a block diagram illustrating a projector of the present invention.

Referring to the drawings, a projector according to the present invention will be described. In FIG. 1, the reference numeral 1 generally indicates the projector, in which red, blue and green cathode ray tubes 2R, 2B and 2G construct displayed pictures, which are then projected by a conventional projecting unit 30 on a screen 40 to form a color picture.

More specifically, a channel selection circuit 4 of the projector 1 changes its operation on the basis of control data outputted from a system control circuit 5, and thereby receives a desired television program by way of an antenna 6.

A demodulation circuit 10 demodulates output signals from the channel selection circuit 4 to generate red, blue and green chrominance signals SR1, SB1 and SG1. In this event, the chrominance signals SR1, SB1 and SG1 are corrected according to control signals outputted from the system control circuit 5.

A selection circuit 12 switches contacts according to control signals outputted from the system control circuit 5 for outputting chrominance signals SR1, SB1 and SG1 or chrominance signals SR2, SB2 and SG2, outputted from a video tape recorder (VTR) 14, to selection circuits 16R, 16B and 16G, respectively.

The chrominance signals are inputted via selection circuits 16R, 16B and 16G to amplifiers 18R, 18B and 18G, which drive cathode ray tubes 2R, 2B and 2G on the basis of the chrominance signals, respectively. In this manner, a displayed picture of the corresponding chrominance signals is formed on each of cathode ray tubes 2R, 2B and 2G.

In this event, amplifiers 18R, 18B and 18G make correction of brightness, contrast, etc. on respective cathode ray tubes 2R, 2B and 2G according to control data outputted from the system control circuit 5.

The desired television broadcast program or the reproduced picture of the video tape recorder is thus formed on the screen 40 by projecting the displayed pictures, constructed on the cathode ray tubes 2R, 2B and 2G, on the screen.

The system control circuit 5 outputs control data in response to the operations of the switches 20A, 20B, 20C, . . . , and thereby controls the whole operation of the projector 1.

More specifically, the system control circuit 5 outputs control data to a power supply circuit 21 when the power switch 20A is activated, and the power supply circuit 21 is thereby turned on to provide a power supply VCC to each circuit block of the projector 1.

When switches 20B, 20C, . . . , such as for brightness and sound volume, are activated in this state, control data are sent to corresponding circuit blocks to correct the brightness, sound volume, etc.

Furthermore, when the power supply circuit 21 is turned on, the system control circuit 5 switches the selection circuits 16R, 16B and 16G for a predetermined time interval, so that chrominance signals SREFR, SREFB and SREFG from the reference signal generating circuit 22 are fed to the amplifiers 18R, 18B and 18B, respectively. Thus, fluctuation in registration is reduced in a short time.

It is considered that the fluctuation in the registration which changes as time passes is produced due to electric charges accumulated on the inner surface of the glass of each of the cathode ray tubes 2R, 2B and 2G. It was confirmed that the fluctuation of the registration was reduced to within a practically acceptable range as a sufficient period of time passed.

Moreover, it was found that the fluctuation in registration fell within a practically allowable range in a short time when the beam current which flowed in each of the cathode ray tubes 2R, 2B and 2G was made large. On the other hand, it was also noted that it took about 2 to 3 hours to reduce the fluctuation of the registration within a permissible range in a case where beam currents are small as in a gray display picture, for example.

From these facts, if sufficient beam currents are caused to flow in cathode ray tubes 2R, 2B, and 2G by inputting reference signals at a luminance level of about 100%, it is possible to reduce the fluctuation of the registration to within a practically acceptable range in a very short time.

For this purpose, the reference signal generating circuit 22 generates chrominance signals SREFR, SREFB and SREFG for uniformly displaying a white picture with a luminance level of about 100% all over the screen, and outputs the chrominance signals to the selection circuits 16R, 16B and 16G.

Figure 2:
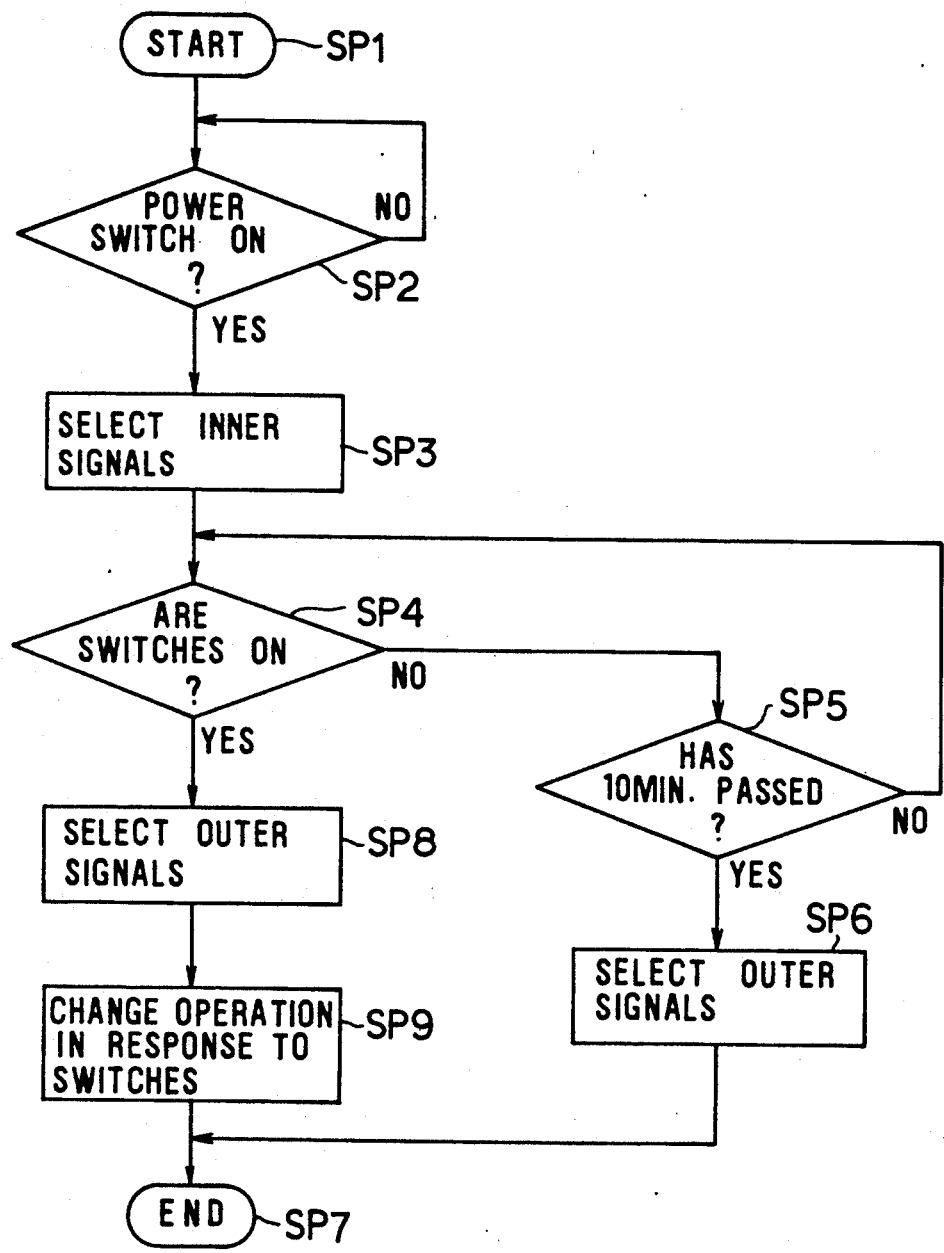
FIG. 2 is a flow chart showing the operation of the projector of FIG. 1.

Corresponding to this, the system control circuit 5 executes the procedures shown in FIG. 2, and thereby places the cathode ray tubes in a condition, where there is little fluctuation in registration, in a short time.

More specifically, in the step SP2 the system control circuit 5 judges whether or not the power switch 20A is on. When a negative result is given in this step, the step SP2 is repeated.

When the power switch 20A as shown in FIG. 3A, is on, the system control circuit 5 proceeds to the step SP3, in which the system control circuit 5 outputs control data to the power supply circuit 21 to provide the power supply VCC (FIG. 3B), and then outputs control data to the selection circuits 16R, 16B and 16G for selecting contacts b on the side of the reference signal generating circuit 22 in place of the contacts a for the selection circuit 12 (FIG. 3C and 3D).

In this manner, the system control circuit 5 causes chrominance signals SREFR, SREFB and SREFG to be outputted from the reference signal generating circuit 22 to the amplifiers 18R, 18B and 18G instead of the chrominance signals from the selection circuit 12, so that a white picture with a luminance level of 100% is uniformly displayed over the whole screen.

Subsequently, the system control circuit 5 goes to the step SP4, in which it judges whether or not switches 20B, 20C, . . . except the power switch 20A are turned on.

When the result is negative in this step, the system control circuit 5 proceeds to the step SP5 where it decides whether or not 10 minutes have passed since application of the power. When a negative result is obtained, the system control circuit 5 returns to the step SP4. The loop of steps SP4-SP5 is repeated until 10 minutes passes after the power is applied.

In a case where a white picture is displayed at a luminance level of about 100%, in this embodiment fluctuation in registration is reduced to within a practically acceptable range in about 10 minutes.

Accordingly in the system control circuit 5, an affirmative result is given in the step SP5 in 10 minutes after the application of the power, and then in the step SP6 the contacts of the selection circuits 16R, 16B and 16G are changed over. Then, the system control circuit 5 goes to the step SP7 and completes the routine.

This routine enables displayed pictures to be constructed on the basis of the chrominance signals SR1, SB1 and SG1 of the television program or the chrominance signals SR2, SB2 and SG2, outputted from the video tape recorder 14, with a reduced fluctuation in registration.

However, users may want to watch a desired program immediately after the power is applied. For this purpose, an affirmative result is provided in the step SP4 if switches 20B, 20C, . . . except the power switch 20A are turned on (FIG. 3E) before 10 minutes passes after the application of the power. Then, the system control circuit 5 goes to the step SP8, in which contacts of the selection circuits 16R, 16B and 16G are switched (FIG. 3D).

Subsequently, the system control circuit 5 proceeds to the step SP9, where in response to turning on of switches, adjustments of the sound volume, the brightness, the contrast, and the hue, switching of the selection circuit 12 and selection of channels are performed, and then the system control circuit 5 goes to the step SP7 to complete the routine.

These operations enable the user to monitor the desired displayed picture immediately after the power is applied.

By turning on the power switch 20A, in this embodiment the power VCC is supplied to each circuit block, and chrominance signals SREFR, SREFB and SREFG which are outputted from the reference signal generating circuit 22 are supplied to amplifiers 18R, 18B and 18G via selection circuits 16R, 16B and 16G, respectively. Thus, the white displayed picture with the luminance level about 100% is displayed on the screen.

This enables each of the cathode ray tubes 2R, 2B and 2G to be placed in a condition where there is little fluctuation in registration, and after the contacts of the selection circuits 16R, 16B and 16G are switched in 10 minutes, an excellent displayed picture is produced on the screen 40.

On the other hand, to monitor a desired displayed picture immediately after the application of the power, the selection circuits 16R, 16B and 16G are switched by turning on predetermined switches 20B, 20C, . . . , so that the desired displayed picture is monitored by shortening the period of the display of the white picture.

Although in the embodiment it is stated that a white picture with a luminance level about 100% is displayed for 10 minutes after the application of the power, any time period of the display may be set according to need. Moreover, in view of facility various pictures with a uniform brightness or color may be projected all over the screen instead of the white picture with about 100% luminance level.

In the embodiment, the operation of the projector is changed in response to the operations of the switches 20A, 20B, 20C, . . . , but the present invention may be applied to a case where the operation of the projector is changed to respond to actuators of a remote commander.

Although in the embodiment, the case where a television broadcast or a video tape recorder is monitored is described, the present invention may be applied to various projectors which display various pictures.

What is claimed is:
1. A projector, which comprises:
a plurality of cathode ray tubes corresponding to different colors:
projecting means for superimposing displayed pictures constructed in the cathode ray tubes on a screen;
operating means for operating the projector to produce a predetermined effect;
color picture signal input means for inputting color picture signals to the corresponding cathode ray tubes to display predetermined color pictures on the cathode ray tubes;
reference signal supplying means for supplying reference signals to the corresponding cathode ray tubes for a predetermined period of time after application of power so that one of both a picture with a uniform brightness and a picture with a uniform color is formed all over the screen in response to the reference signals, whereby fluctuation in registration of the displayed pictures is effectively reduced; and
control means for controlling the color picture signals to be supplied to the cathode ray tubes instead of the reference signals when the operating means is activated during the predetermined period of time, whereby a picture is displayed on the screen in place of one of the picture with the uniform brightness or the picture with the uniform color.

* * * * *